(12) United States Patent
Weigand et al.

(10) Patent No.: US 10,508,955 B2
(45) Date of Patent: Dec. 17, 2019

(54) SENSOR DEVICE FOR MEASURING THE INTERIOR TEMPERATURE OF A MOTOR VEHICLE WITH LATCHING MEANS

(71) Applicant: PREH GMBH, Bad Neustadt A.D. Saale (DE)

(72) Inventors: Stefan Weigand, Bad Neustadt A.D. Saale (DE); Melitta Bott, Hollstadt (DE)

(73) Assignee: PREH GMBH, Bad Neustadt A.D. Saale (DE)

( * ) Notice: Subject to any disclaimer, the term of this patent is extended or adjusted under 35 U.S.C. 154(b) by 333 days.

(21) Appl. No.: 15/686,172

(22) Filed: Aug. 25, 2017

(65) Prior Publication Data

US 2018/0058942 A1   Mar. 1, 2018

(30) Foreign Application Priority Data

Aug. 27, 2016 (DE) .......... 10 2016 010 455

(51) Int. Cl.
*G01K 1/14* (2006.01)
*B60R 21/015* (2006.01)
(Continued)

(52) U.S. Cl.
CPC .......... *G01K 1/14* (2013.01); *B60H 1/00742* (2013.01); *B60H 1/00792* (2013.01);
(Continued)

(58) Field of Classification Search
CPC .......... G06K 9/00362; G06K 9/00791; G06K 9/209; G06K 9/00369; G06K 9/00624; G06K 9/00832; B60N 2/002; B60N 2002/0268; B60N 2002/0272; B60R 11/04; B60R 21/015; B60R 2001/1223; B60R 2001/1253
(Continued)

(56) References Cited

U.S. PATENT DOCUMENTS 3,967,302 A * 6/1976 Cote .................... G03B 17/566
                                                            396/198
5,020,424 A   6/1991 Iida et al.
(Continued)

FOREIGN PATENT DOCUMENTS

CN       201812393 U  *  4/2011
CN       107155053 A  *  9/2017  ............. G03B 17/08
(Continued)

*Primary Examiner* — Gail Kaplan Verbitsky
(74) *Attorney, Agent, or Firm* — Norman B. Thot (57) ABSTRACT

A sensor device for measuring an interior temperature of a motor vehicle. The motor vehicle includes an inner trim which includes an aperture and latching springs. The sensor device includes a housing which is inserted in an insertion direction into the aperture of the inner trim of the motor vehicle, a circuit board arranged in the housing, at least one electrical temperature sensor element arranged on the circuit board, and latching lugs arranged on the housing which form an engagement with the latching springs formed on the inner trim. The engagement of the latching lugs with the latching springs forms a latching arrangement which fixes the housing when inserted into the aperture.

17 Claims, 7 Drawing Sheets

(51) Int. Cl.
*B60R 11/04* (2006.01)
*B60H 1/00* (2006.01)
*G01K 1/16* (2006.01)
*G01K 1/20* (2006.01)

(52) U.S. Cl.
CPC ............ *B60R 11/04* (2013.01); *B60R 21/015* (2013.01); *G01K 1/16* (2013.01); *G01K 1/20* (2013.01)

(58) Field of Classification Search
USPC .................... 374/208, 121, 141; 73/866.5
See application file for complete search history.

(56) References Cited

U.S. PATENT DOCUMENTS

| | | | | |
|---|---|---|---|---|
| 6,559,882 | B1 * | 5/2003 | Kerchner | H05B 6/6435 219/506 |
| 6,608,910 | B1 * | 8/2003 | Srinivasa | G06K 9/00362 382/100 |
| 6,749,364 | B1 * | 6/2004 | Baker | E01C 19/288 404/118 |
| 8,942,007 | B2 * | 1/2015 | Takamura | H01R 13/2407 361/801 |
| 9,358,857 | B2 * | 6/2016 | Lee | B60R 13/025 |
| 9,834,165 | B2 * | 12/2017 | Rao | B60R 21/01534 |
| 10,156,439 | B2 * | 12/2018 | Fay | G01B 11/27 |
| 2002/0003571 | A1 * | 1/2002 | Schofield | B60C 23/00 348/148 |
| 2002/0048308 | A1 | 4/2002 | Knittel et al. | |
| 2004/0223534 | A1 | 11/2004 | Trapp et al. | |
| 2006/0141845 | A1 * | 6/2006 | Hu | H01R 13/6275 439/350 |
| 2008/0036186 | A1 * | 2/2008 | Schockmel | B60N 2/888 280/735 |
| 2013/0033826 | A1 * | 2/2013 | Takamura | H01R 13/2407 361/748 |
| 2014/0137656 | A1 | 5/2014 | Henzler et al. | |
| 2017/0174129 | A1 * | 6/2017 | Chin | G01C 21/3647 |
| 2017/0302881 | A1 * | 10/2017 | Sakiewicz | H04N 5/772 |
| 2018/0252519 | A1 * | 9/2018 | Fay | G01B 11/27 |

FOREIGN PATENT DOCUMENTS

| | | |
|---|---|---|
| CN | 207748463 U * | 8/2018 |
| DE | 40 24 431 A1 | 2/1991 |
| DE | 198 29 143 C1 | 7/1999 |
| DE | 201 18 265 U1 | 1/2002 |
| DE | 100 49 979 C2 | 8/2002 |
| DE | 103 14 862 A1 | 10/2004 |
| DE | 10 2008 011 676 A1 | 9/2009 |
| DE | 10 2008 062 011 A1 | 6/2010 |
| DE | 10 2010 030 769 A1 | 1/2012 |
| DE | 10 2011 079 446 A1 | 2/2013 |

* cited by examiner

SENSOR DEVICE FOR MEASURING THE INTERIOR TEMPERATURE OF A MOTOR VEHICLE WITH LATCHING MEANS

CROSS REFERENCE TO PRIOR APPLICATIONS

Priority is claimed to German Patent Application No. DE 10 2016 010 455.4, filed Aug. 27, 2016. The entire disclosure of said application is incorporated by reference herein.

FIELD

The present invention relates to a sensor device for measuring the interior temperature of a motor vehicle. In order to automatically regulate the interior temperature in a motor vehicle, it is necessary to know the actual interior temperature at a certain point in time. A manipulated variable is usually formed therefrom which reflects the deviation of the actual interior temperature from the intended interior temperature. The manipulated variable serves to regulate the difference.

BACKGROUND

DE 40 24 431 A1 describes a method where the manipulated variable serves to regulate the difference between the actual interior temperature from the intended interior temperature.

DE 198 29 143 C1 describes a method for changing the interior temperature of a motor vehicle. An interior temperature-sensing device and an exterior temperature sensor are provided for compensating a change of the actual value of the interior temperature due to external influences, such as, for example, a low exterior temperature. The interior temperature-sensing device is located in the control device.

The interior temperature in some methods is determined using a ventilated temperature sensor. A ventilation motor commonly disposed in the climate control device thereby draws air from the interior of the motor vehicle and feeds it to a temperature sensor via a suction duct. The use of a ventilation motor with an associated ventilation ducts is frequently considered disadvantageous because it may generate a certain amount of noise and/or because the operation of the interior temperature sensor is faulty if the ventilation motor fails.

The measurement of the interior temperature via an NTC resistor (negative temperature coefficient resistor) directly on the surface of the interior trim, such as the dashboard, without forced ventilation, has also previously been described. DE 100 49 979 C2 describes, for example, a device for determining the temperature in the interior of a motor vehicle in which a temperature-sensing device is disposed behind a wall adjacent to the interior. A heat-conducting element serves to acquire the temperature of the air of the interior within the area thereof close to the wall. The heat-conducting element is in heat-conducting contact with the temperature-sensing device and is mounted in the wall via an opening. The interference from partial solar radiation is detected on the sensor housing and is correspondingly corrected by this device.

DE 10 2010 030 769 A1 describes a sensor device with two temperature sensor elements, wherein one, or the thermally conductive cap associated with the temperature sensor element, is disposed to protrude into the interior at a location which is as exposed as possible while extending through an aperture of the interior trim. This assembly is problematic in that a touching contact of this cap or of the associated temperature sensor element is to be avoided for an undisturbed measurement, and the protruding part projecting from the interior trim may be critical with regard to the so-called crash criterion, such as head and/or knee crash criterion. Components projecting from the instrument panel and/or the interior trim are therefore to be avoided, but the maximum delay in the case of an impact caused by an accident is also to be limited by design measures.

SUMMARY

An aspect of the present invention is to provide a sensor device for a motor vehicle which is improved with regard to its attachment to an interior trim and in which the danger of injury in the event of an impact of a passenger on the sensor device is reduced.

In an embodiment, the present invention provides a sensor device for measuring an interior temperature of a motor vehicle. The motor vehicle comprises an inner trim which comprises an aperture and latching springs. The sensor device comprises a housing configured to be inserted in an insertion direction into the aperture of the inner trim of the motor vehicle, a circuit board arranged in the housing, at least one electrical temperature sensor element arranged on the circuit board, and latching lugs arranged on the housing which are configured to form an engagement with the latching springs formed on the inner trim. The engagement of the latching lugs with the latching springs forms a latching arrangement which fixes the housing when inserted into the aperture.

BRIEF DESCRIPTION OF THE DRAWINGS

The present invention is described in greater detail below on the basis of embodiments and of the drawings in which.

DETAILED DESCRIPTION

The present invention relates to a sensor device for measuring the interior temperature of a motor vehicle, which has a housing configured for insertion along an insertion direction into an aperture of an inner trim of the motor vehicle. The housing can, for example, be inserted into the aperture starting from a rear side of the inner trim facing away from the passenger to provide the intended installation position. The housing can, for example, be manufactured from a substantially thermally non-conductive, a thermally insulating, or at least a thermally low-conducting material, such as a plastic, for example, a thermoplastic material.

A circuit board received in the housing is provided according to the present invention. The circuit board can, for example, have an orientation which is parallel with the insertion direction. The circuit board can for example, be oriented with its largest dimension parallel to the insertion direction.

At least one electrical temperature sensor element disposed on the circuit board is provided according to the present invention. At least two electrical temperature sensor elements, for example NTC resistors, can, for example, be provided.

A latching arrangement to fix the housing inserted into the aperture is provided according to the present invention, wherein the latching arrangement has latching lugs on the housing which are configured to cooperate with latching springs formed on the inner trim. A reliable disengagement and thus detachment of the sensor device from the inner trim in the case of an impact, such as of a body part of a passenger, during a vehicle crash, can be provided in a comparatively simply manner via this latching arrangement. By designing the latching arrangement in a goal-oriented manner, the minimum loosening torque required for disengagement can in particular be set in a specific manner. The housing can, for example, have latching lugs which rise on two diametrically opposite sides in a direction perpendicular to the insertion direction and which, in the latched state, respectively reach into apertures or depressions of a latching spring associated with the inner trim.

In an embodiment of the present invention, the latching lugs, relative to the insertion direction, can, for example, be beveled on both sides in a ramp-like manner. The ramp the latching spring must run up on for disengagement, relative to the insertion direction, can, for example, be more steeply inclined, without assuming a right angle with this direction, than the ramp against which the latching spring must run up on during insertion and prior to latching.

In an embodiment of the present invention, the housing of the sensor device can, for example, have ribs which protrude perpendicularly to the insertion direction and which extend parallel to the insertion direction.

In an embodiment of the present invention, the ribs can, for example, be configured to establish a respective touching contact with the inner trim, for example, for support on the inner trim. These ribs can, for example, be configured to form a positive connection with the inner trim.

In an embodiment of the present invention, the ribs can, for example, be disposed so as to flank the latching lugs in each case on both sides.

In an embodiment of the present invention, the ribs can, for example, be configured so that the latching springs are levered out of the engagement with the latching lugs when the sensor device is twisted and/or tilted in the aperture of the inner trim. This is caused, for example, by a bevel of the narrow side of the rib or the rib end face at the outer free end of the rib, which is ramp-shaped relative to the insertion direction.

In an embodiment of the present invention, the latching lugs can, for example, be formed integrally with the housing. The ribs can, for example, be produced in a molding method together with the housing.

In an embodiment of the present invention, the sensor device can, for example, comprise a cap which is thermally conductive in comparison with the material of the housing and which is provided and configured, when the sensor device is disposed in the aperture, to protrude into the aperture and, for example, to project over the edge of the aperture of the inner trim, and which is in a thermally conductive contact with at least one temperature sensor element. The cap can, for example, be configured to not form any touching contact with the inner trim by being disposed therein, spaced from the edge of the aperture by a clear distance.

In an embodiment of the present invention, the circuit board can, for example, have a weakened-material portion, such as a cut, a notch, and/or a constricted portion, for providing a predetermined breaking point. The circuit board can, for example, have a cut extending perpendicularly to the insertion direction or a notch extending across the circuit board perpendicularly to the insertion direction in order to obtain a premature break in the circuit board at a predetermined location in the event of a crash.

In an embodiment of the present invention, the housing can, for example, be provided to have a weakened-material portion, such as a cut or a constricted portion. This measure can, for example, be combined with the previously described measure in which a predetermined breaking point is provided in the circuit board. At the end which projects over the rear side of the inner trim and which is opposite to the end intended for arrangement in the aperture, the housing can, for example, have a portion for an electrical and mechanical plug-in connection, wherein the predetermined breaking point is provided for breaking off, and thus separating, the portion of the housing provided for the electrical and mechanical plug-in connection from the remaining rest of the housing in the event of a crash.

The present invention further relates to an assembly of an interior trim of a motor vehicle and a sensor device in any one of the previously described configurations.

The present invention further relates to the use of the previously described assembly in any one of its configurations in a motor vehicle. The assembly can, for example, be disposed in a trim of the center console, for example, in a steering column cover, of the motor vehicle.

The present invention is explained in greater below under reference to the drawings which are to be understood only as examples and which merely represent an embodiment of the present invention.

Figure 1:
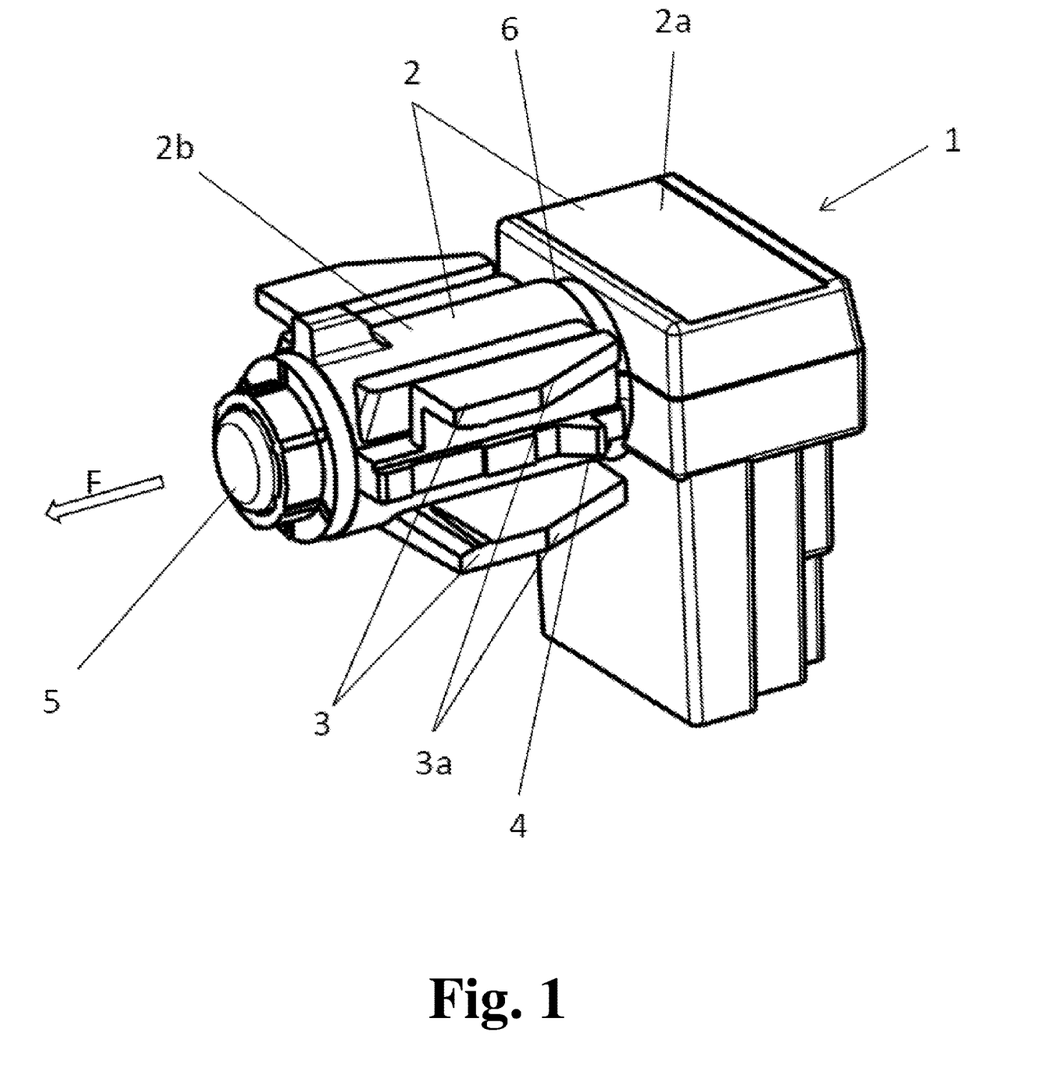
FIG. 1 shows a perspective of an embodiment of the sensor device according to the present invention.

FIG. 1 shows an embodiment of the sensor device 1 according to the present invention. The sensor device 1 has a housing 2 produced in an injection-molding process from a thermoplastic material. The sensor device 1 is provided to be inserted into an aperture of an interior trim of a motor vehicle shown below, from the rear side of the interior trim facing away from the interior of the motor vehicle, along the insertion direction F shown in FIG. 1, so that the thermally conductive cap 5 of the sensor device 1, which is inserted into the aperture and projects slightly over the edge of the aperture, protrudes into the interior. The cap 5 is in thermally conductive contact with a temperature sensor element described below. The housing portion 2b serves to fix the sensor device 1 to the interior trim, whereas the housing portion 2a is configured as a plug receptacle for electrically contacting the sensor device 1. The plug receptacle 2a is configured so that the plug-in direction for establishing the plug-in connection must be at right angles with the insertion direction F. The housing 2 is integrally formed, but has a constricted portion 6 between the housing portions 2a and 2b which constitutes a predetermined breaking point designed to minimize the danger of an injury in the event of a crash and associated impact on the sensor device 1 by the housing 2 being capable of dissipating energy. The housing portion 2b has latching lugs 4 on two diametrically opposite sides which rise perpendicularly to the insertion direction F and which are flanked by two ribs 3 each that extend parallel to the insertion direction F. At the narrow side or end face located at their free ends, the ribs 3 have a portion 3a which is beveled relative to the insertion direction and which is configured so that, when the sensor device 1 is twisted or tilted, the ribs 3 end up underneath the latching springs of the inner trim and cause the latching springs to disengage from the engagement with the latching lugs 4.

Figure 2:
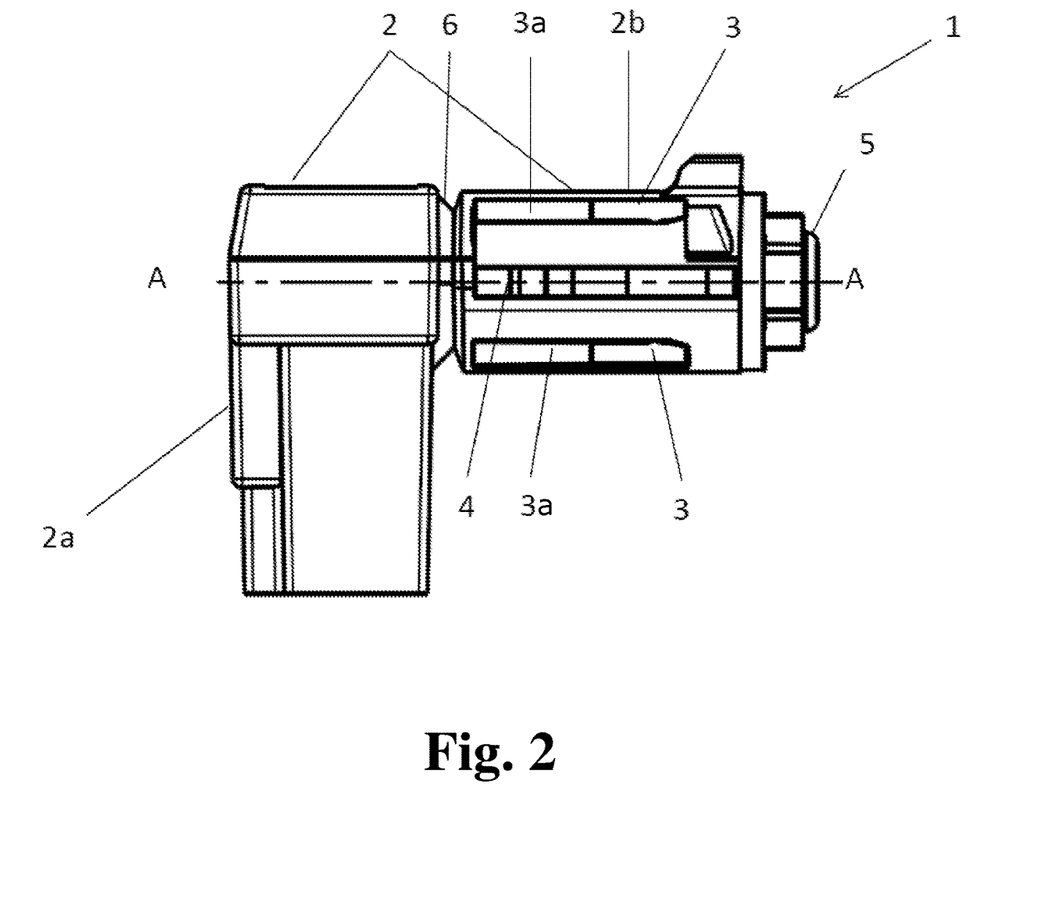
FIG. 2 shows a side view of the sensor device according to the present invention of FIG. 1.

A side view of one of the two flanks of the sensor device 1 provided with the latching lugs 4 can be seen in FIG. 2. The peripheral constricted portion 6 of the housing 2 for providing a predetermined breaking point between the housing portions 2a and 2b is also illustrated.

Figure 3:
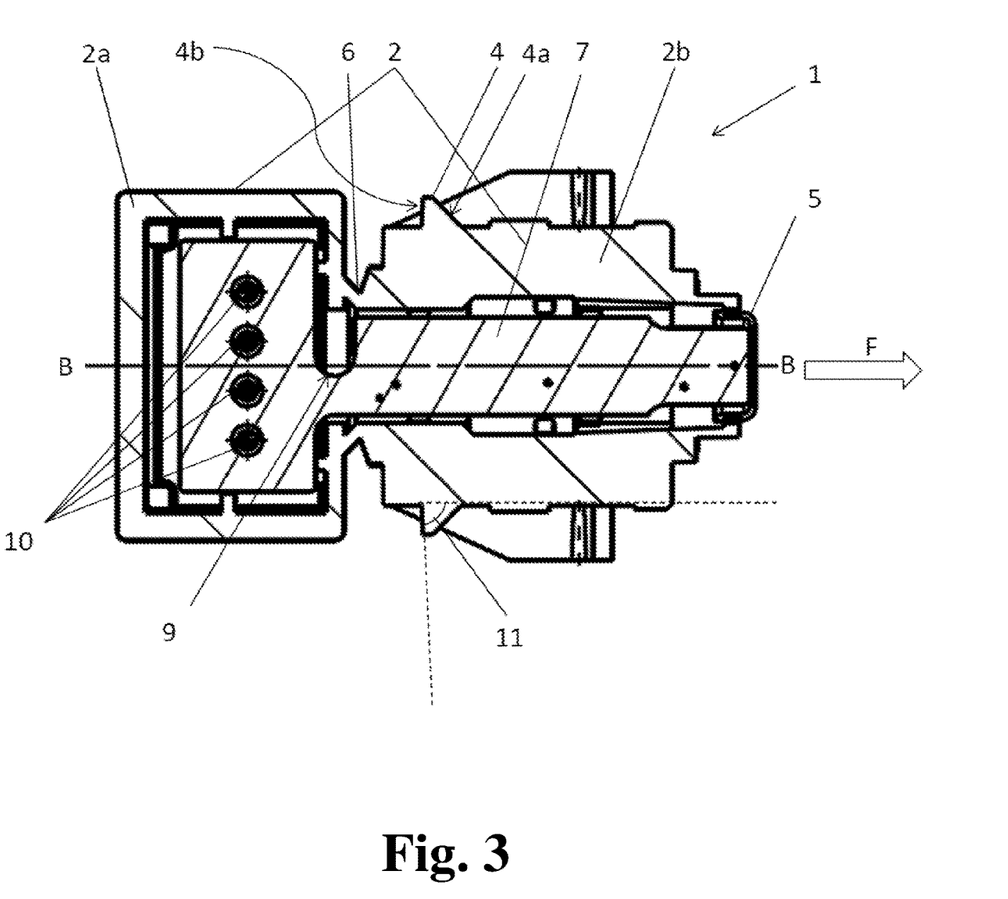
FIG. 3 shows a sectional view of the sensor device according to the present invention taken along section line A-A of FIG. 2.

FIG. 3 is the illustration of the sensor device 1 corresponding to the sectional line A-A from FIG. 2. As is shown, a circuit board 7, whose orientation and largest dimension corresponds to the insertion direction F and which extends through the housing portions 2a and 2b, is disposed in the housing 2. A cut 9 in the circuit board 7 is also provided in the area of the constricted portion 6 provided in the housing 2 so that the circuit board 7 also breaks at a predetermined point in the event of a crash, and thus an impact, in order to minimize the risk of injury. As FIG. 3 shows, contact pins 10 or contact sleeves for electrical contacting are soldered to the circuit board 7. The latching lugs 4 have, relative to the insertion direction F, a front ramp 4a and a rear ramp 4b. The slope of the front ramp 4a is designed to facilitate the latching action with the latching springs via the latching springs running up on the front ramp 4a during insertion. The slope of the rear ramp 4b associated with the latching lug 4, which has an angle 11 in an amount of less than 90°, for example, of 85°, with the insertion direction F, is designed to facilitate a disengagement of the latching spring from the engagement with the latching lug 4 in the event of the previously described crash scenario.

Figure 4:
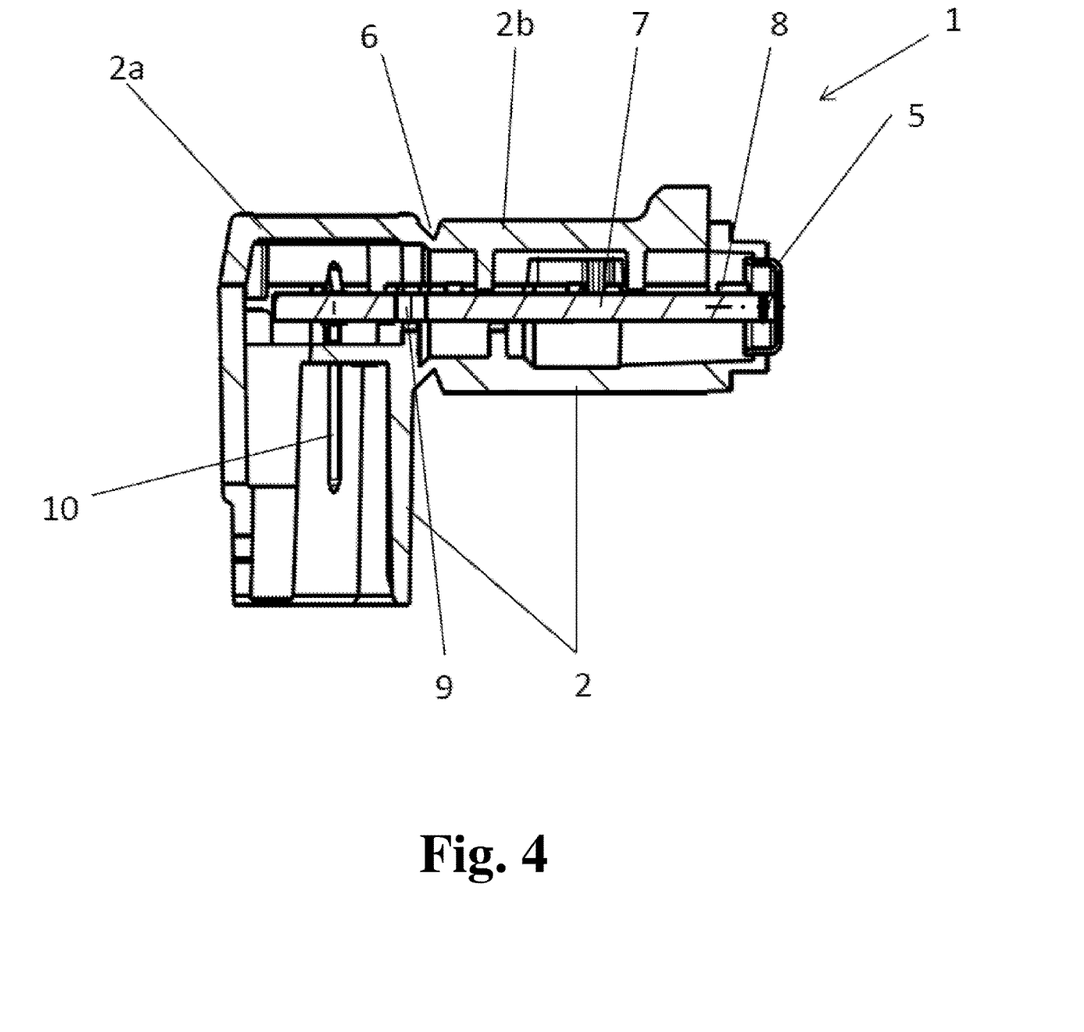
FIG. 4 shows a sectional view of the sensor device according to the present invention taken along section line B-B of FIG. 3.

As becomes clear from FIG. 4, which is a sectional view corresponding to the sectional line B-B from FIG. 3, the circuit board 7, among other things, also serves for the supportive retention and electrical contacting of a temperature sensor element 8 which is disposed to be thermally conductively connected to the thermally conductive cap 5.

Figure 5:
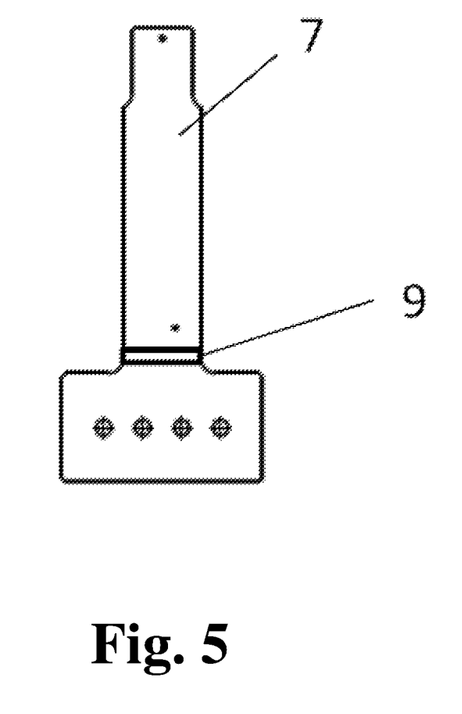
FIG. 5 shows a first variant of the circuit board of the sensor device according to the present invention.
Figures 6, 7:
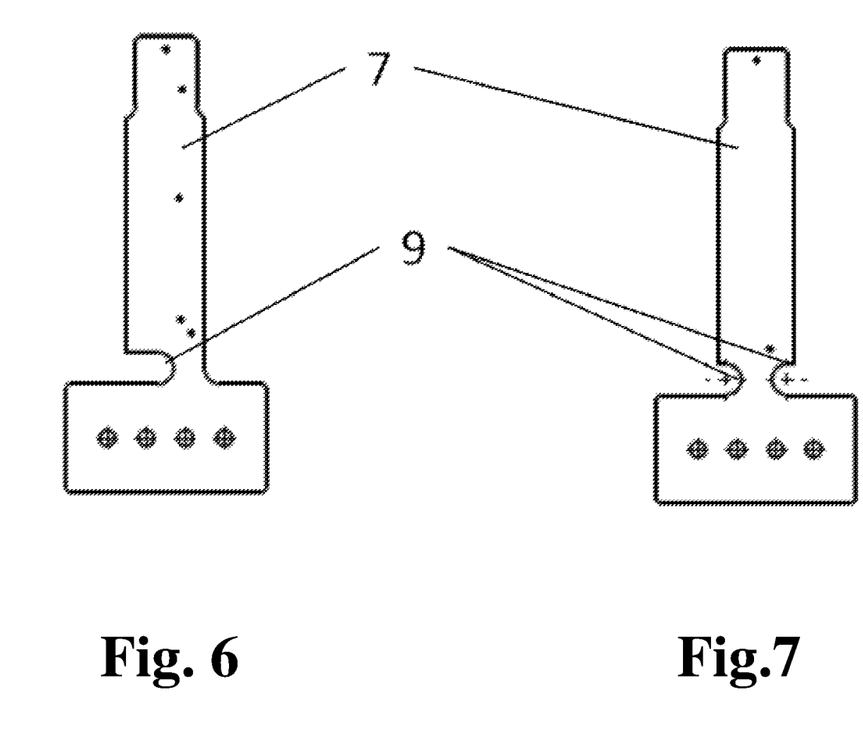
FIG. 6 shows the circuit board of the sensor device according to the present invention of FIG. 1.
FIG. 7 shows a second variant of the circuit board of the sensor device according to the present invention.

FIGS. 5 to 7 show different configurations of the circuit board according to the present invention. While the embodiment according to FIG. 6 corresponds to the embodiment shown in FIGS. 1 to 4, the embodiments of the FIGS. 5 and 7 are also conceivable as an alternative, without limiting the present invention to the embodiments shown. For example, FIG. 7 shows a cut 9 on both sides, whereas in FIG. 5, the weakened-material portion and thus the predetermined breaking point is provided by a notch 9 extending over the broad side of the circuit board 7.

Figure 8:
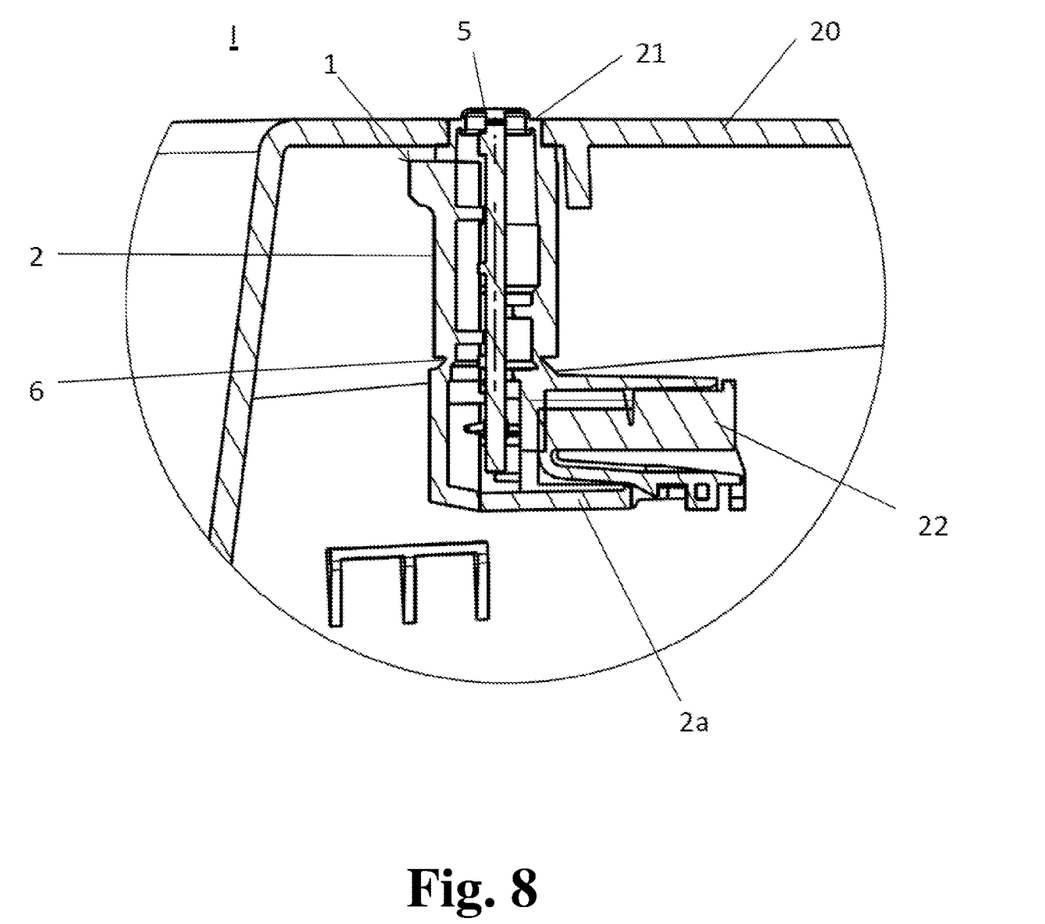
FIG. 8 shows a sectional view of an assembly according to the present invention of an interior trim of a motor vehicle and a sensor device of FIG. 1.
Figure 9:
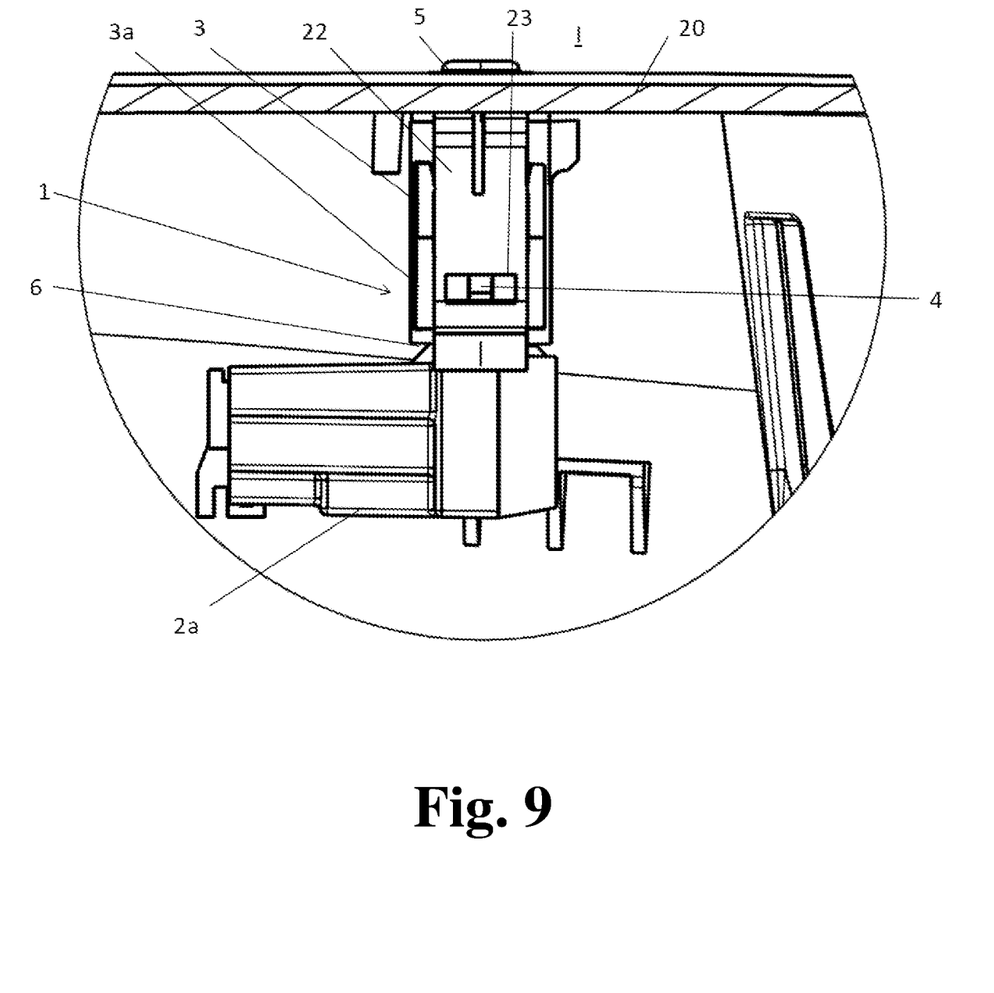
FIG. 9 shows a side view of the assembly of FIG. 8.

FIGS. 8 and 9 show the assembly according to the present invention which consists of the interior trim 20 and the sensor device 1 latched thereto, as it is shown in FIGS. 1 to 4. The sensor device 1 is thereby designed to be inserted into an aperture 21 of the interior trim from the side facing away from the interior I so that the thermally conductive cap 5 protrudes into the interior I and projects over the edge of the aperture 21. A clear distance is thereby provided between the thermally conductive cap 5 and the edge of the aperture 21. By preventing a touching contact between the thermally conductive cap 5 and the inner trim 20, the danger of convection from the interior trim 20 to the thermally conductive cap 5 affecting the temperature measurement is minimized.

As becomes clear from FIG. 9, the sensor device 1 is latched to the interior trim 20 via a latching arrangement 4, 22, and is thus fixed in the position shown. The latching arrangement 4, 22 comprises the latching lugs 4 provided on the part of the sensor device 1 and the latching springs 22 formed by the interior trim 20 and projecting from the rear side of the interior trim 20. The latching springs 22 have apertures 23 into which the latching lugs 4 reach, so that the sensor device 1 is latched to the inner trim 20 and fixed. The ribs 3 of the sensor device establish a touching contact with the interior trim 20 via the latching springs 22 being positively received between, in each case, one pair of the ribs 3 disposed so as to flank the associated latching lug 4. At the free ends, the end face of each of the ribs 3 is beveled relative to the insertion direction F in the portion 3a. This bevel provides that, in the event of a crash and the tilting of the sensor device 1 resulting therefrom, one of the ribs 3 reaches under the latching spring 22, and that the leverage caused thereby causes the latching spring 22 to lift out of the engagement with the latching lug 4, and thus a detachment of the sensor device 1 from the interior trim 20, so that the risk of injury is minimized, as was already explained with reference to FIG. 1.

The present invention is not limited to embodiments described herein; reference should be had to the appended claims. The features cited individually in the claims can thereby be combined with each other in any technologically meaningful manner and represent other embodiments of the present invention.

What is claimed is:

1. A sensor device for measuring an interior temperature of a motor vehicle, the motor vehicle comprising an inner trim which comprises an aperture and latching springs, the sensor device comprising:
   a housing configured to be inserted in an insertion direction into the aperture of the inner trim of the motor vehicle;
   a circuit board arranged in the housing;
   at least one electrical temperature sensor element arranged on the circuit board; and
   latching lugs arranged on the housing which are configured to form an engagement with the latching springs formed on the inner trim,
   wherein,
   the engagement of the latching lugs with the latching springs forms a latching arrangement which fixes the housing when inserted into the aperture.

2. The sensor device as recited in claim 1, wherein each of the latching lugs has a first side and a second side, the first side and the second side each being beveled relative to the insertion direction in a ramp-like manner.

3. The sensor device as recited in claim 1, wherein the housing comprises ribs which are configured to protrude perpendicularly to the insertion direction and to extend parallel to the insertion direction.

4. The sensor device as recited in claim 3, wherein each of the ribs are further configured to establish a touching contact with the inner trim.

5. The sensor device as recited in claim 4, wherein the touching contact with the inner trim provides a support on the inner trim.

6. The sensor device as recited in claim 4, wherein the ribs are arranged so that each of the latching lugs are flanked on both sides.

7. The sensor device as recited in claim 6, wherein the ribs are configured to disengage from the latching arrangement when the sensor device is at least one of twisted and tilted in the aperture of the inner trim.

8. The sensor device as recited in claim 7, wherein the ribs are configured to disengage from the latching arrangement via the latching springs being levered out of the engagement with the latching lugs.

9. The sensor device as recited in claim 1, wherein the latching lugs are formed integrally with the housing.

10. The sensor device as recited in claim 1, wherein the housing comprises a cap which is configured to be thermally conductive and to project over an edge of the aperture of the inner trim, the cap being arranged to be in thermally conductive contact with the at least one temperature sensor element.

11. The sensor device as recited in claim 1, wherein the circuit board is configured to have an orientation which is parallel to the insertion direction.

12. The sensor device as recited in claim 1, wherein the circuit board comprises a weakened-material portion which is configured to provide a predetermined breaking point.

13. The sensor device as recited in claim 12, wherein the weakened-material portion is provided as at least one of a cut, a notch, and a constricted portion.

14. The sensor device as recited in claim 1, wherein the housing comprises a weakened-material portion which is configured to provide a predetermined breaking point.

15. The sensor device as recited in claim 14, wherein the weakened-material portion is provided as at least one of a cut and a constricted portion.

16. An assembly comprising:
    an interior trim of a motor vehicle, the interior trim comprising an aperture and latching springs; and
    a sensor device comprising:
        a housing configured to be inserted in an insertion direction into the aperture of the inner trim of the motor vehicle,
        a circuit board arranged in the housing,
        at least one electrical temperature sensor element arranged on the circuit board, and
        latching lugs arranged on the housing which are configured to form an engagement with the latching springs formed on the inner trim,
    wherein,
        the engagement of the latching lugs with the latching springs forms a latching arrangement which fixes the housing when inserted into the aperture.

17. A method of using the assembly as recited in claim 16 in a motor vehicle, the method comprising:
    providing a motor vehicle; and
    arranging the assembly in the motor vehicle.

* * * * *